United States Patent [19]

Snavely, Jr. et al.

[11] Patent Number: 4,779,679

[45] Date of Patent: Oct. 25, 1988

[54] METHOD FOR SCALE AND CORROSION INHIBITION IN A WELL PENETRATING A SUBTERRANEAN FORMATION

[75] Inventors: Earl S. Snavely, Jr., Arlington, Tex.; John Hen, Skillman, N.J.

[73] Assignee: Mobil Oil Corporation, New York, N.Y.

[21] Appl. No.: 122,301

[22] Filed: Nov. 18, 1987

[51] Int. Cl.$^4$ .................. E21B 41/02; E21B 43/12
[52] U.S. Cl. ..................... 166/279; 166/300; 166/902; 252/8.552; 252/8.555
[58] Field of Search .............. 166/279, 300, 310, 371, 166/902; 252/8.552, 8.555

[56] References Cited

U.S. PATENT DOCUMENTS

| | | | |
|---|---|---|---|
| 2,437,475 | 3/1948 | Oxford, Jr. ................ | 252/8.555 |
| 3,481,400 | 12/1969 | Kerver et al. ............... | 166/279 |
| 3,547,817 | 12/1970 | Hansen, Jr. et al. ......... | 252/8.552 X |
| 3,633,672 | 11/1972 | Smith et al. ................. | 166/279 |
| 4,231,869 | 11/1980 | Carlberg et al. ............. | 166/902 X |
| 4,393,938 | 7/1983 | Lawson et al. .............. | 166/279 |
| 4,495,996 | 1/1985 | Meyers et al. .............. | 166/279 |
| 4,602,683 | 7/1985 | Meyers ....................... | 166/279 |

Primary Examiner—George A. Suchfield
Attorney, Agent, or Firm—Alexander J. McKillop; Michael G. Gilman; Lawrence O. Miller

[57] ABSTRACT

A method for inhibiting the formation of scale and corrosion in a well penetrating a subterranean formation for the production of fluids from the formation comprising injecting a predetermined amount of microparticles of a cation exchange resin loaded with the desired cations into the formation about the well that are trapped and retained by the interstices of the formation without rendering the interstices or the formation impermeable to the flow of fluids. Thereafter a predetermined amount of an aqueous solution of scale and corrosion inhibitor is injected into the formation about the well that contacts the cation exchange resin and becomes fixed in a slightly soluble state either by complexation with the cations or is precipitated by the cations in the exchange resin. The scale and corrosion inhibitor is released slowly at effective concentration into fluids produced by the well to inhibit scale formation and corrosion.

11 Claims, No Drawings

METHOD FOR SCALE AND CORROSION INHIBITION IN A WELL PENETRATING A SUBTERRANEAN FORMATION

FIELD OF THE INVENTION

This invention relates to inhibiting scale formation and corrosion in a well penetrating a subterranean formation.

BACKGROUND OF THE INVENTION

In the production of water, oil and gas from subterranean formations, scale deposits can frequently result in: plugged well bores, plugged well casing perforations, plugged tubing strings, stuck downhole safety valves as well as other valves, stucked downhole pumps and other downhole and surface equipment and lines, scaled formations and fractures in the vicinity of the well. Such scale formation can occur as a result of mixing of incompatible waters in the well, i.e., waters which when mixed produce precipitates, or as a result of temperature and pressure changes and the like in the produced waters during production. Generally, incompatible waters are formed as a consequence of waterflooding, as injected sea water mixes with formation water in the borehole during water breakthrough. The more common concern are scales deposited because of changes in supersaturation or solubility of minerals in the formation or produced waters caused by pressure and temperature changes, or changes in other physical and chemical environments such as gas compositions, ratio of gas/oil/water. Precipitates which are frequently encountered as scale include calcium carbonate, calcium sulfate, barium sulfate, magnesium carbonate, magnesium sulfate, and strontium sulfate. The deposition of scale is a very complex crystalline process initiated by a supersaturation-induced nucleation of a precipitate of the mineral, scale ions contact these nuclei and the crystal grows in certain crystalline pattern. The adherence of these mineral crystals unto the formation matrix, perforation, well-bore, tubings and equipment is a not well-understood process but once initiated, appears to be spontaneous as seen by the increasing thickness of the scale deposit and the steady decline in productivity. In some cases, production can be halted when valves and pumps are stuck—creating a potentially dangerous situation.

The squeezing of chemicals for protecting wells, particularly oil wells, is widely practiced. A "squeeze" job might last one to six months depending on the nature of the subterranean formation into which the chemical is squeezed and the rate at which fluids e.g., oil and water, are produced by the well. A formation that has low permeability but high porosity, and from which low rates of oil and water are produced would likely bleed injected chemicals back for a long time. However, a problem arises with highly permeable formations which produce high rates of oil and water. This type of formation retains chemicals for only a short time because they are readily washed out of the permeable zones of the formation by the high volumes of produced fluids.

In an article by Carlberg and Essel entitled, "Strontium Sulfate Scale Control by Inhibitor Squeeze Treatment in the Fateh Field", published in the *Journal of Petroleum Technology* in June 1982, there is disclosed a method for inhibiting scale formation in a subterranean limestone formation by injecting an acid form of a polyphosphonate which forms a slightly soluble calcium salt. Calcium ions released on dissolution of some of the limestone (calcium carbonate) rock by the acid precipitates calcium polyphosphonate allowing greater retention in the rock. However, this method does not work in sandstones, because sandstones are not soluble in acids, nor do they form calcium ions even when dissolved.

U.S. Pat. No. 3,827,977, discloses the use of water-insoluble metal salts of relatively low molecular weight polyacrylic acids and/or relatively low molecular weight hydrolyzed polyacrylamides as scale inhibitors placed at or near the bottom of a well or formed in situ in the formation that are slowly released into fluids produced by the well.

U.S. Pat. No. 4,602,683 discloses a scale inhibitor precipitation squeeze method wherein an aqueous scale inhibitor solution containing amine phosphates including salts thereof, having solubility that significantly decreases with decreasing pH, is injected into a formation near a well and thereafter the pH of the solution is lowered to precipitate the scale inhibitor in the formation.

In Applicants' co-pending application Ser. No. 122,170, filed Nov. 18, 1987, there is disclosed a method for inhibiting scale formation and corrosion in a well penetrating a subterranean formation by trapping microparticles of a basic anion exchange resin fixed with a scale and corrosion inhibitor in the interstices of the formation in the vicinity of and surrounding the well without rendering the interstices impermeable to the flow of fluids whereby the scale and corrosion inhibitor subsequently bleeds back into fluids produced by the well from the formation, thereby inhibiting scale formation and corrosion in the well and the production system.

The present invention provides a method for inhibiting scale formation and corrosion in a well penetrating a subterranean formation by trapping microparticles of a cation exchange resin fixed with a scale and corrosion inhibitor in the interstices of the formation in the vicinity of and surrounding the well without damaging the formation or hindering the flow of fluids. The scale and corrosion inhibitor subsequently bleeds back into fluids produced by the well from the formation, thereby inhibiting scale formation and corrosion.

SUMMARY OF THE INVENTION

This invention is directed to a method for inhibiting the formation of scale and corrosion in a well penetrating a subterranean formation for the production of fluids from the formation comprising injecting a predetermined amount of microparticles of a cation exchange resin loaded with the desired cations into the formation about the well that are trapped and retained by the interstices of the formation without rendering the interstices or the formation impermeable to the flow of fluids and then injecting a predetermined amount of an aqueous solution of a scale and corrosion inhibitor into the formation about the well that upon contact with the cation exchange resin becomes fixed in a slightly soluble state either by complexation with the cations or is precipitated by the cations. As formation fluids are produced from the well, the scale and corrosion inhibitor is released slowly at effective concentration to inhibit scale formation and corrosion. Suitable scale and corrosion inhibitors include organic polycarboxylic acids, modified polyacrylic acids, homopolymers or copolymers where one component is an alpha, beta-ethylenically unsaturated acid monomer and the other component is an alpha, beta-ethylenically unsaturated monomer with a non-polar or ionic functional group, phosphates, phosphate ester and organic polyphosphonates. In another embodiment the cation exchange resin providing a source of desired cations and the scale and corrosion inhibitor which is fixed in a slightly soluble state either by complexation with the cations or precipitation by the cations may be preblended prior to injection into the formation about the well. In another embodiment, a cation exchange resin with an easily exchanged cation is fixed into the interstices of the formation, then exchanged with the desired polyvalent cation, followed by injection of a scale and corrosion inhibitor which is fixed to the formation by the polyvalent cation.

DESCRIPTION OF THE PREFERRED EMBODIMENT

In accordance with the present invention, a subterranean formation is penetrated by a wellbore, including a casing in fluid communication therewith by means of well casing perforations in the zone of the formation. Production occurs from the formation by the flow of fluids including oil, gas and water through the perforations into the well bore with the fluids then being recovered. The production of fluids from the well can be inhibited by the formation of scale which plugs or partially plugs perforations in the casing of the wellbore, tubing inside the casing, downhole equipment such as pumps and safety valves or the formation near the well.

The present invention inhibits the formation of scale and corrosion by injecting microparticles of a cation exchange resin loaded with the desired cations into the formation near the well followed by injection of a scale and corrosion inhibitor that upon contact with the cation exchange resin forms a slightly soluble or tightly bonded complex with the cations or is precipitated by the cations and is slowly released from the formation with the produced aqueous fluids as the well is produced to inhibit scale formation and corrosion.

In the first step of our process, a predetermined amount of microparticles of an acidic cation exchange resin (either weakly, moderately basic or strongly acidic forms) loaded with the desired multivalent cations, preferably calcium, aluminum, chromium, iron or titanium, is injected into the formation through the well whereby the microparticles of cation exchange resin are trapped and retained by the interstices within the formation in the vicinity of and surrounding the well. The size range of the microparticles is dependent on the average pore size, pore size distribution and the median pore entry radii. In order to allow unobstructed entry, the microparticles are preferably equal to or below 1/3 the median pore entry radii. For instance, for a low permeability sandstone with a mean pore entry radii of 2 microns, the microparticles are preferably below 0.67 microns; whereas for a high permeability sandstone with a mean pore entry radii of 15 microns, microparticles as large as 5 microns can be utilized. The microparticles loaded with the desired multivalent cations should ideally be sufficiently small to enter the pore mouths and formation fractures and be lodged or retained in the small void volumes or interstices which will not affect the production rate of fluids. Likewise, the microparticles should not be too fine as to be transported too far away from the producing zone where it may not play a beneficial role. These small particle sizes can be obtained by either finely grounding and separating existing large size commercial ion exchange resins or directly using aqueous suspension sold under the tradenames "Biocryl BPA-1000" and "Biocryl BPA-1050" by Rohm and Haas Company, U.S.A.

Suitable cation exchange resins include all cation exchange materials whether inorganic or organic in composition and being in exchangeable form. The original acid form of the cation exchange resin or material can either be weakly, moderately, or strongly acidic. The easily exchangeable form of the cation exchange resin is then loaded or converted with the desired multivalent cations. The amount of this converted resin injected is that which corresponds to 0.1 to 5 equivalents of cation exchange capacity per mole of scale or corrosion inhibitor to be applied subsequently or together. Preferably, this ratio is in the 0.5 to 2 range. The normal exchange capacity of cation exchange resins available is between 1 to 5 milliequivalents per gram of dry resin or exchanger. The cation exchanger is injected in the form of an aqueous suspension or an aqueous colloidal dispersion which may optionally contain some surface active agents or polyelectrolytes to stabilize the suspension. Trapping the microparticles of the cation exchanger in the formation does not decrease the permeability of the formation to the extent that there is an adverse effect in the production rate of fluids including oil and water, because the injected microparticles are in a size range at which the permeable zones of the formation are not plugged.

Once the microparticles of cation exchange resin loaded with the desired cations are trapped in the interstices of the formation near the well, a predetermined amount of an aqueous solution of a scale and corrosion inhibitor is injected into the formation via the well that upon contact with the trapped microparticles of cation exchange resin becomes fixed in a slightly soluble state either by complexation with the cations or is precipitated by the polycations. Thus, residual scale and corrosion inhibitor is retained in the formation and slowly released from the formation with the produced aqueous fluids as the well is produced thereby inhibiting formation of scale deposits in the formation in the vicinity of the wellbore, casing perforations, tubing and other downhole equipment as well as corrosion in the well. Generally, injection of the particles of cation exchange resin and subsequent injection of the aqueous solution of scale and corrosion inhibitor is designated to extend at least several inches (>2) to several feet (>5) feet from the wellbore and more preferably more than 5–15 feet radially from the center of the wellbore. In general, an amount of scale and/or corrosion inhibitor solution is injected into the formation surrounding the oil well that is sufficient to feed back a concentration of the inhibitor effective to prevent the formation of scale or corrosion deposits. Typically, the effective concentration is in the range of 0.05 to 50 ppm and preferably 0.5 to 10 ppm in the produced water. The exact quantity of inhibitor solution used for a treatment is dependent on a number of factors unique to the well that is being treated. These factors include: the degree of suspersaturation expected of the scale forming minerals in the produced water, the rate of production of water, temperature and pressure profile in the well, and others. The inhibitor concentration employed can vary from 0.25% to 15% by weight in fresh water, sea water or other available brines, but preferably in the 0.5% to 5% by weight range.

Suitable scale and/or corrosion inhibitors are any chemical which can reduce or eliminate the mineral scale formation and deposition. These include both synthetic and naturally-occurring materials, chemicals which require threshold to stoichiometric (sequestration levels) quantities to inhibit. Threshold chemicals are those which are effective at concentrations below the level required to sequester; thereby, needing only 1/1000 to 1/10 the concentration of scaling mineral. The use of threshold chemicals as inhibitors is preferred. Mixtures of inhibitors or formulated inhibitors can also be employed. The inhibitors can be introduced as the free acid, partially neutralized salt or fully neutralized salt. The following list provide some example but is by no means inclusive: (1) homopolymers or copolymers (composed of two or more co-monomers) containing as one of its components, an alpha, beta-ethylenically unsaturated acid monomer such as acrylic acid, maleic anhydride, monoesters of diacid monomer and the other component in the copolymer can be any alpha, beta-ethylenically unsaturated monomer with either a non-polar, polar or ionic functional group; (2) all of the polymers cited in (1) which have been modified in some manner such as a phosphino-polyacrylic acid sold under the tradenames "Belsperse 161" or "Belasol S29" by Ciba Geigy; (2) polyphosphonates; (3) organic phosphates; (4) anionic surfactants of various functionalities; (5) specific agents such as ethylenediamine tetraacetic acid, nitrilotriacetic acid, hexametaphosphate, tripolyphosphates, sodium carboxymethyl cellulose, gluconic acid and citric acids; and (6) starch, gums, alginates and other polysaccharides.

In another embodiment of our invention, a preblend of the cation exchange resin (providing a source of the desired multivalent cation) and the desired scale and corrosion inhibitor fixed in a slightly soluble state either by complexation with the cations or precipitation by the cations can be injected into the formation about the well.

In still another embodiment of our invention a cation exchange resin in a easily exchangeable cationic form is injected into the formation and retained in the interstices of the formation without hindering fluid flow followed by injection of an aqueous solution of the desired multivalent cations that exchanges with the easily exchangeable cation form to the desired multivalent cation form. Thereafter, the desired scale and corrosion inhibitor is injected into the formation to fix it to the cation exchange resin to provide slow and effective release of the scale and corrosion inhibitor.

All embodiments of our invention may follow other treatments or steps normally associated with a scale prevention program including as examples: acid or solvent wash, mechanical cleaning of the tubings or pumps, any pretreatment with water, surfactant, deemulsifier, wetting agents, polymers, or inhibitor, wax dissolvers, etc. These pretreatments may be used to enhance the placement of the inhibitor solution or to avoid application problems. After the inhibitor has been injected, an overflush of water or gas may be used to push the inhibitor to a greater radial distance.

After the scale and corrosion inhibitor has been placed into the formation production of fluids including oil and water from the well is resumed. The scale and corrosion inhbitor is released slowly at effective concentration to inhibit scale formation or corrosion. The scale and corrosion treatment of this invention may be repeated on a regular basis based on experience or when the chemical return concentration falls below minimum requirements or when other scale forming indicators indicate that additional treatment should be applied.

From the foregoing specification, one skilled in the art can readily ascertain the essential features of this invention, and without departing from the spirit thereof, can adapt it to various diverse applications. It is our intention and desire that our invention be limited only by those restrictions of limitations as are contained in the claims appended immediately hereinafter below.

We claim:

1. A method for inhibiting scale and corrosion in a well penetrating a subterranean formation for the production of fluids from the formation comprising:
   (a) injecting a predetermined amount of microparticles of a cation exchange resin loaded with the desired cations into the formation about the well that are trapped and retained by the interstices of the formation without rendering said interstices or the formation impermeable to the flow of fluids; and
   (b) injecting a predetermined amount of an aqueous solution of scale and corrosion inhibitor into the formation about the well that contacts the cation exchange resin loaded with the desired cations and becomes fixed in a slightly soluble state either by complexation with the cations or is precipitated by the cations contained in said resin.

2. The method of claim 1 wherein the scale and corrosion inhibitor is an organic polycarboxylic acid, a modified polyacrylic acid, homopolymers or copolymers wherein one component is an alpha, beta-ethylenically unsaturated acid monomer and the other component is an alpha, beta-ethylenically unsaturated monomer with a non-polar, polar, or ionic functional group, phosphates, phosphate esters and organic polyphosphonates.

3. The method of claim 1 wherein the microparticles of a cation exchange resin have a diameter less than ten microns.

4. The method of claim 1 wherein the desired cations are multivalent cations with a valency equal to or greater than 2.

5. The method of claim 1 wherein the desired cations are calcium, aluminum, iron, chromium and titanium.

6. The method of claim 1 wherein the cation exchange resin loaded with the desired cations and the scale and corrosion inhibitor fixed in a slightly soluble state either by complexation with the cations or precipitation by the cations are preblended prior to injection into the formation about the well.

7. A method for inhibiting scale and corrosion in a well penetrating a subterranean formation for the production of fluids from the formation comprising:
   (a) injecting a predetermined amount of microparticles of a cation exchange resin in an easily exchangeable cationic form into the formation about the well that are trapped and retained by the interstices of the formation without rendering said interstices or the formation impermeable to the flow of fluids;
   (b) injecting a predetermined amount of a aqueous solution of desired multivalent cations which exchange with the easily exchangeable cation form to the desired multivalent cation form; and
   (c) injecting a predetermined amount of an aqueous solution of scale and corrosion inhibitor into the formation about the well that contacts the cation exchange resin loaded with the desired cations and becomes fixed in a slightly soluble state either by complexation with the cations or is precipitated by the cations contained in said resin.

8. The method of claim 7 wherein the scale and corrosion inhibitor is an organic polycarboxylic acid, a modified polyacrylic acid, homopolymers or copolymers wherein one component is an alpha, beta-ethylenically unsaturated acid monomer and the other component in an alpha, beta-ethylenically unsaturated monomer with a non-polar, polar, or ionic functional groups, phosphates, phosphate esters and organic polyphosphonates.

9. The method claim 7 wherein the microparticles of a cation exchange resin have a diameter less than ten microns.

10. The method of claim 7 wherein the desired cations are multivalent cations with a valency equal to or greater than 2.

11. The method of claim 7 wherein the desired cations are calcium, aluminum, iron, chromium and titanium.

* * * * *